United States Patent [19]

Gelardi et al.

[11] Patent Number: 4,800,641

[45] Date of Patent: Jan. 31, 1989

[54] METHODS FOR MANUFACTURING A TAPE CASSETTE WITH SEPARATE TAPE GUIDE HAVING INTEGRATED ROLLERS

[75] Inventors: Anthony L. Gelardi; John Geladri, both of Cape Porpoise; Vincent E. Landry; Diane C. Pruneau, both of Saco, all of Me.; Alan B. Lowry, Canton, Mass.

[73] Assignee: Shape Inc., Biddeford, Me.

[21] Appl. No.: 103,657

[22] Filed: Oct. 2, 1987

Related U.S. Application Data

[62] Division of Ser. No. 883, Jan. 6, 1987.

[51] Int. Cl.⁴ .......................................... B23P 11/00
[52] U.S. Cl. ...................................... 29/436; 264/242; 264/255; 264/328.8
[58] Field of Search .................. 29/436, 773; 264/242, 264/255, 297.8, 328.1, 328.8; 242/199; 360/132

[56] References Cited

U.S. PATENT DOCUMENTS

| | | | |
|---|---|---|---|
| Re. 32,447 | 6/1987 | Gelardi et al. | 242/199 |
| 3,432,111 | 3/1969 | Ryder | 242/199 X |
| 3,796,394 | 3/1974 | Souza | 242/199 |
| 3,829,040 | 8/1974 | Nelson | 242/199 |
| 3,934,842 | 1/1976 | Posso | 242/199 |
| 4,079,499 | 3/1978 | Bagozzi | 29/453 |
| 4,122,985 | 10/1978 | Nelson | 360/132 X |
| 4,126,283 | 11/1978 | Kawachi | 242/199 |
| 4,166,593 | 9/1979 | Milants | 242/199 |
| 4,267,986 | 5/1981 | Uemura et al. | 242/199 |
| 4,387,823 | 6/1983 | Shiba | 242/199 X |
| 4,506,846 | 3/1985 | Gelardi et al. | 242/199 |
| 4,545,500 | 10/1985 | Yamaguchi et al. | 242/199 X |

FOREIGN PATENT DOCUMENTS 5650354 1/1980 Japan .

*Primary Examiner*—Timothy V. Eley
*Assistant Examiner*—Frances Chin
*Attorney, Agent, or Firm*—Staas & Halsey

[57] ABSTRACT

A tape cassette with a separate, plastic, molded, elongated, tape guide subassembly is described. The tape guide subassembly incorporates two bearing extensions integrally molded at the left and right ends thereof. Each bearing extension is a pair of opposing, parallel, planar members extending from support members, each of which is parallel to the planar top and bottom of the tape guide subassembly. Each planar member includes a roller receiving means integrally formed therein and the rotational axles for the tape rollers are either integrally molded as part of the bearing extension or the tape roller itself. The planar members in each pair have the ability to flex only in the direction perpendicular to their planes, allowing the rollers to be easily snapped into place during assembly. Once the rollers are inserted into the tape guide subassembly, the latter is assembled into the front of the tape cassette, wherein the rollers form part of the central tape support area of the tape cassette. Related methods are also described for manufacturing, including particularly the steps of: forming the tape guide by a one-step injection molding to include a one-piece bridge with left and right ends, each of which includes a bearing extension integrally molded therein, and roller receptacles also integrally molded in each bearing extension; injection molding a one-piece roller having an axle integrally molded therewith whose ends extend from the roller; locating the roller in the roller receptacle for rotation; forming the cassette top half and bottom half to include bearing extension receptacles; and inserting the tape guide subassembly into the tape cassette such that the bearing extensions are received by the bearing extension receptacles.

24 Claims, 6 Drawing Sheets

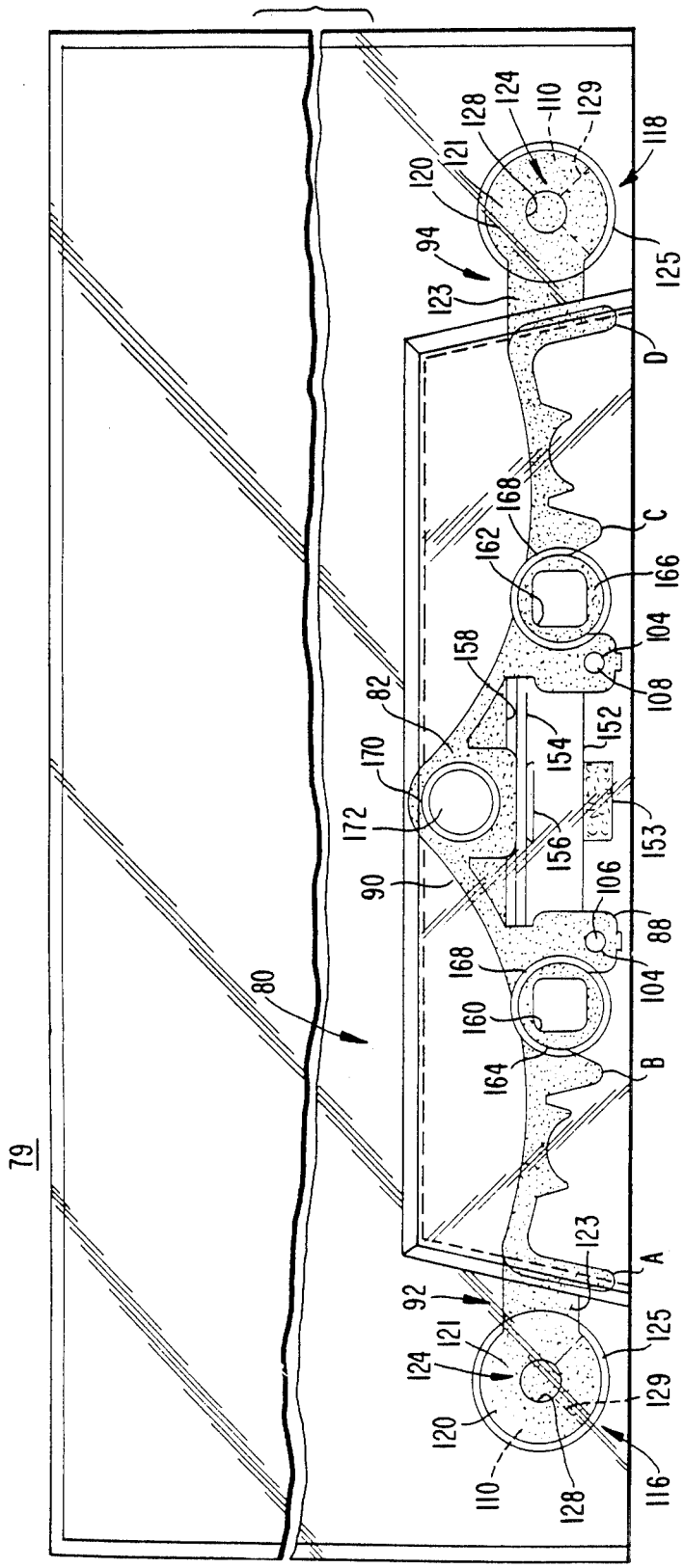

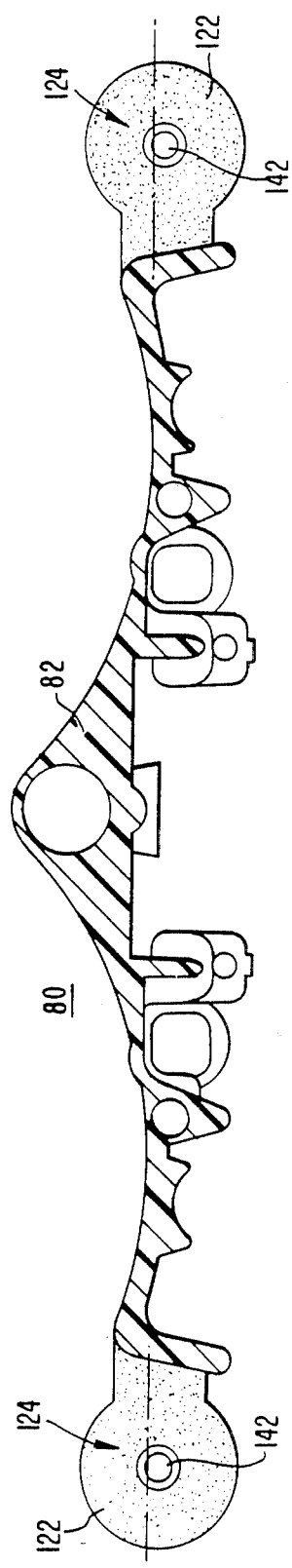
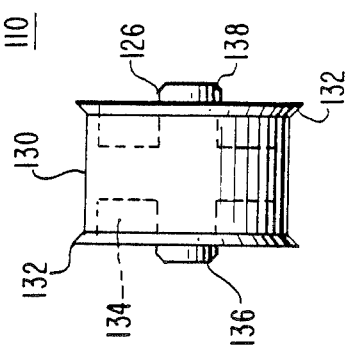
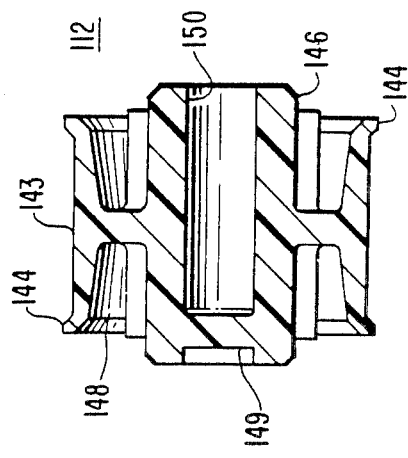

METHODS FOR MANUFACTURING A TAPE CASSETTE WITH SEPARATE TAPE GUIDE HAVING INTEGRATED ROLLERS

This is a divisional of co-pending application Ser. No. 000,883, filed on Jan. 6, 1987.

BACKGROUND OF THE INVENTION

This invention relates to a type cassette and, more particularly, to methods for manufacturing an audio tape cassette with an independent or separate, plastic molded, tape guide having integrated rollers for improving tape movement across the magnetic head of a tape player/recorder.

Separate, plastic molded, tape guides for tape cassettes are known in the art, as described most recently in co-owned U.S. Pat. No. 4,506,846 (now U.S. Re. Ser. No. 823,481), and shown in FIGS. 1 and 2 herein. More particularly, the tape cassette shown is indicated generally by reference numeral 10 and includes a bottom half 12 and a top half 14, preferably made of, but not limited to, a clear material. When assembled, the tape cassette 10 (and accordingly each cassette half 12 and 14) has, viewing from the bottom of FIG. 1, a front 16, a back 18, a left side 20 and a right side 22. Positioned within the tape cassette 10 are a first tape reel 24 and a second tape reel 26 which rotate to move tape 28 across the front 16 of the tape cassette 10.

Formed on the bottom half 12 of the tape cassette 10 are corner tape guiding shafts 30 and 32. There are also provided tape rollers 34 and 36 having through holes formed therein which are rotatably received by roller axial columns 38 and 40. The columns 38 and 40 are formed on bottom bosses 200, which together are molded as part of the bottom half 12. Corresponding top bosses 201 are formed on the top half 14 to receive the free ends of the columns 38 and 40 when the tape cassette 10 is assembled. The rollers 34 and 36 are located within areas defined by circular recesses 41 formed in both the top half 14 and bottom half 12, concentric to the bosses 200 and 201. As is the predominant practice in the industry, the rollers 34 and 36 are completely independent of the tape guide subassembly 44 which is located at the front 16 of the tape cassette 10 and which constitutes the conventional central tape support area.

As best seen in FIG. 2, to assemble the tape cassette 10, the columns 38 and 40 projecting from the empty bottom half 12 are lubricated and then the separate rollers 34 and 36 are positioned on the columns 38 and 40. The rollers 34 and 36 must thereafter be contained during the assembly process to prevent them from being dislocated as the bottom half 12 is transported to the tape guide subassembly station. The tape guide subassembly 44 is then positioned within a recess 42 formed in the bottom half 12 (the top half 14 has a complementary recess 46 formed therein) and the tape reels 24 and 26 with tape 28 extending therebetween are positioned on a substantially flat washer 54 having holes 50 formed therein located on the bottom half 12. The reels 24 and 26 are located by a pair of raised annular rings 21 formed on the bottom half 12. The tape 28 extends (from left to right) across the tape guiding shaft 30, the roller 34, the front of the tape guide subassembly 44, the roller 36 and the tape guiding shaft 32. A complementary washer 52 with holes 48 formed therein is then placed into the empty top half 14, which is then located on the bottom half 12. As a result, the free ends of columns 38 and 40 are received by recesses in bosses 201, and the reels 24 and 26 are also located by a pair of raised annular rings 23 formed on the top half 14 between the relatively central planar areas of the top and bottom halves, 14 and 12, respectively. The rollers 34 and 36 are then allowed to rotate during operation on the columns 38 and 40, respectively, while abutting bosses 200 and 201.

The conventional tape guide subassembly 44 described above provides some control over alignment of the tape 28 at the central tape support area in front of the tape guide subassembly 44 where the magnetic head makes contact with the tape 28 during operation. However, another important consideration in controlling tape alignment is the relationship of the rollers 34 and 36 to the tape guide subassembly 44.

When the columns 38, 40 are molded on the bottom half 12 and bosses 200, 201 are molded in both halves 12 and 14, molding imperfections can be expected. If the rollers 34 and 36 are then positioned on defective columns 38, 40, respectively, and abut defective bosses 200 and 201, tape misalignment can result between the top half 14 and the bottom half 12. Even the smallest misalignment can diminish tape recording/reproducing quality.

Another important drawback of the conventional use of rollers 34, 36 mounted on columns 38, 40 formed on the bottom half 12 is the inherent molding difficulties in creating accurate "concentricity" of the roller's inside diameter to its tape bearing surface. Attempting to create such concentricity requires careful and difficult control of very subtle parameters which, of course, increases the overall cost of manufacturing the tape cassette.

Further, due to various molding tolerances and assembly effects, a clearance is required axially of the roller 34, 36, i.e., between each end of the roller and the respective cassette halves 12 and 14. Although necessary, excessive clearance does not contribute to optimum tape recording/reproducing quality.

Finally, this tape cassette 10, like any tape cassette employing separate rollers between the cassette halves, exhibits the persistent drawbacks of misplacement of the rollers 34, 36, breakage of the columns 38, 40 and excess lubrication during assembly, each of which causes the tape cassette 10 to be scrapped during quality inspection.

On the other hand, the earlier U.S. Pat. No. 4,079,499, issued to BAGOZZI, discloses a tape cassette having a separately formed, metal tape guide incorporating rollers at the ends thereof as shown in FIG. 3 herein (BAGOZZI also briefly suggests a plastic molded tape guide with rounded ends, but generally teaches away from the use of plastic for tape cassette members, see Col. 3, line 1 and Col. 4, lines 37-63) More particularly, a tape cassette 58 is shown including a metal top half 60, a metal bottom half 62 and a metal tape guide 64 positioned therebetween. The metal tape guide 64 is made by repeatedly bending and blanking sheet metal to form front support surfaces 66 for the tape (not shown) and side supports 68 for receiving tape guide rollers 70. The tape guide 64 also has upper ears 72 and lower ears (not shown), allowing removable assembly between the halves 60 and 62 during assembly of the tape cassette 58. There is also provided lightening notches 76, which define therebetween tabs 78 bearing the side supports 68, such that the side supports 68 are elastic in a direction toward the back of the tape guide 64.

This tape cassette 58 is not known to have gained acceptance in the industry for the following reasons.

First, this metal tape guide 64 is believed to result in poor tape reproducing and recording quality because the rough metal front support surfaces 66 necessarily create unwanted friction with the travelling tape. It is, however, not believed to be practical to attempt to polish them enough to minimize friction.

Second, as is easily comprehended by viewing FIG. 3 herein, this metal tape guide 64 is made by a relatively complicated, time-consuming, costly, multi-step method, wherein the sheet metal must repeatedly be bent and blanked. Such bending and blanking does not easily lend itself to automation or adequate dimensional reproducibility for mass production purposes. For example, it would be very difficult to guarantee that each left side of the BAGOZZI tape guide could repeatedly be formed to the same exacting dimensions as the right side of the tape guide, a requirement for accurate tape tracking.

Third, metals are known to have certain imperfections or impurities therein which would affect the ability to accurately bend and blank the tape guide 64.

Fourth, any member in a tape cassette which can be magnetized, such as this metal tape guide 64, could quickly put an end to the useful life of the tape cassette.

Fifth, it appears from BAGOZZI (FIG. 3 therein) that a separate axial pin 69, presumably also made of metal, is provided for each of the rollers, with the pin 69 extending into through holes formed in the tape rollers and then through the side supports. Although not described, it appears clear that, in order to assemble the metal tape guide of BAGOZZI, external force must be used to separate each side support 68 to allow insertion of each roller 70. Then the through hole formed axially in each roller 70 must be visually lined up with the pair of colinear holes formed in the side support 68 before the pin 69 can be inserted from above or below, because there is no means for automatically directing the centerline of the roller 70 to the desired position. Once the pins 69 are inserted into the rollers 70, the pins 69 would have to be swedged or the tape guide would have to be quickly inserted into the cassette base 62 to prevent the pins 69 from falling out. Again, as with U.S. Pat. No. 4,506,846, discussed above, concentricity problems arise and a clearance must be provided between the rollers 70 and the side supports 68 for the rollers to rotate.

Sixth, in some manner each roller must be lubricated to facilitate rotation within the metal side supports. For example, the roller ends may be lubricated prior to insertion into the side supports. Instead, or in addition, the pins 69 may be lubricated prior to insertion into the rollers 70. In either case, once lubricated the rollers and/or pins would be difficult to handle. As a result, this method further increases assembly cost and complexity and thus does not lend itself to mass production of tape cassettes.

Seventh, and most importantly, although it is not clear from a review of BAGOZZI, it would appear that a clearance must also exist between the side supports 68 and the cassette halves 60 and 62, or else the pins 69 extending from the rollers 70 would contact the cassette halves 60 and 62 and impede rotation of the rollers 70 (see FIG. 8 of BAGOZZI). As a result, the side supports 68 intentionally remain elastic in the direction of the back of the tape cassette 58 during operation. Apparently, the side supports 68 are intended to act as shock absorbers to minimize tape slack during loading of the tape or during normal operation. Unfortunately, this shock absorber effect creates an ever-changing tape guiding surface, not a fixed, accurate surface which is preferred. Further, such a variable tape guide undoubtedly will vary the tape speed, resulting in wow and flutter, which is also a major disadvantage. Finally, it is also to be expected that the spring-like ability of the metal side supports 68 will diminish with time, adding to the ever-changing tape guiding surface.

Japanese Reference No. 56-50354 appears to show a plastic-molded, independent tape guide having rollers mounted for rotation at the ends thereof. It is not clear from this reference whether the rollers include a separate inserted or integrally formed axle. However, the tape guide taught by this reference suffers at least from the seventh drawback discussed above relative to BAGOZZI, and perhaps the fifth and sixth drawbacks also.

That is, the roller bearings which receive the rollers shown in the Japanese Reference are intentionally designed to flex elastically in a direction toward the back of the tape cassette during operation. As with BAGOZZI's tape guide, such a tape guide creates an ever-changing tape guiding surface, not the fixed accurate surface preferred.

In light of the above, methods for easier and less expensive manufacture of a tape cassette, including a separate tape guide characterized by improved tape alignment accuracy, is desired.

SUMMARY OF THE INVENTION

Accordingly, it is an object of the present invention to provide a tape guide with integrated rollers having a precision formed, non-variable tape guiding surface.

It is another object of the present invention to provide tape guide having integrated rollers whose dimensions can be accurately controlled with a high degree of reproducibility.

It is another object of the present invention to provide a tape cassette with a separate, plastic molded, tape guide having integrated rollers capable of economical, high quality manufacturing.

It is another object of the preset invention to provide a tape cassette with a separate, plastic molded, tape guide having integrated rollers which can be quickly and accurately formed of plastic and assembled efficiently by automation.

It is another object of the present invention to provide a tape cassette with a separate, plastic molded, tape guide having integrated rollers providing superior alignment of the tape relative to the magnetic head of the tape player/recorder in comparison with prior art tape cassettes.

Finally, it is an object of the present invention to provide methods for manufacturing a tape cassette and a separate, plastic molded, tape guide having integrated rollers, characterized by greater speed and more accurate control over the tape guide dimensions than prior art methods.

Additional objects and advantages of the invention will be set forth in part in the description which follows and, in part, will be obvious from the description, or may be learned by practice of the invention. The objects and advantages of the invention may be realized and obtained by means of the instrumentalities and combinations particularly pointed out in the appended claims.

To achieve the foregoing and other objects of the present invention and in accordance with the purposes of the invention there is provided a tape cassette with a separate, plastic molded, elongated, tape guide subassembly. The tape guide subassembly incorporates two bearing extensions integrally molded at the left and right ends thereof. Each bearing extension is a pair of opposing, parallel planar members received by corresponding structures formed in the tape cassette cover and base. Each planar member includes a roller receiving means formed therein. The planar members in each pair have the ability to flex in the direction perpendicular to their planes only, allowing a rotatable roller to be easily snapped into the roller receiving means during assembly. The axles for rotation of the tape rollers are preferably formed as either an integral part of the injection molded tape guide or of the injection molded rollers. Once the rollers are inserted into the tape guide subassembly, the latter is assembled into the front of the tape cassette, wherein the rollers form part of the central tape support area of the tape cassette.

The present invention also includes methods for manufacturing the tape cassette and tape guide subassembly described above, including the steps of: forming the tape guide subassembly by a one-step injection molding to include a one-piece bridge with left and right ends, each of which includes a bearing extension integrally molded therein; forming roller receiving means in each bearing extension; forming a one-piece, molded roller having an axle whose ends extend from the roller; locating the roller in the roller receiving means for rotation; forming the cassette top half and bottom half to include bearing extension receiving means; and inserting the tape guide subassembly into the tape cassette such that the bearing extensions are received by the bearing extension receiving means.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a top, plan view of the tape cassette according to the present invention, illustrating particularly a first embodiment of the separate, plastic molded, tape guide subassembly with integrated rollers positioned therein;

FIG. 5 is a front view of the tape cassette shown in FIG. 4;

FIG. 8 is a top, cross-sectional view of a third embodiment of the tape guide subassembly according to the present invention;

FIG. 9 is a side, cross-sectional view of one embodiment of the roller used in the present invention;

FIG. 10 is a side view of another embodiment of the roller used in the present invention;

DETAILED DESCRIPTION OF THE PREFERRED EMBODIMENTS

The preferred embodiments of the present invention will now be described with reference to FIGS. 4–12.

Figure 2:
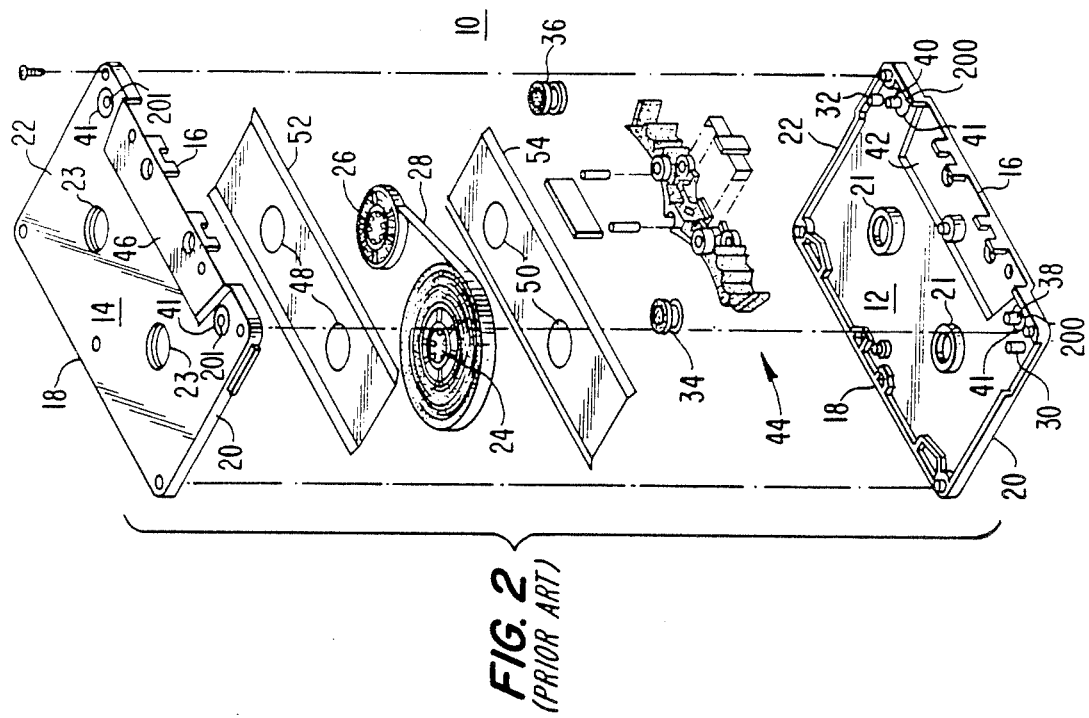
FIG. 2 is an exploded, isometric view of the known tape cassette shown in FIG. 1, illustrating particularly assembly of the plastic molded, tape guide and rollers within the tape cassette.
Figure 1:
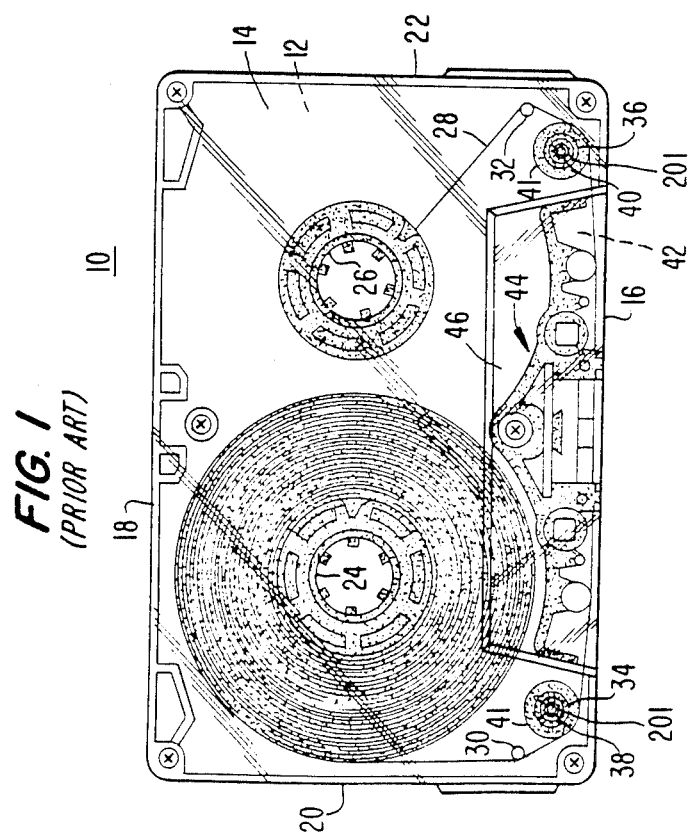
FIG. 1 is a top, plan view of a known tape cassette, illustrating particularly a plastic molded, tape guide positioned therein and separate rollers located directly between the cassette halves.
Figure 3:
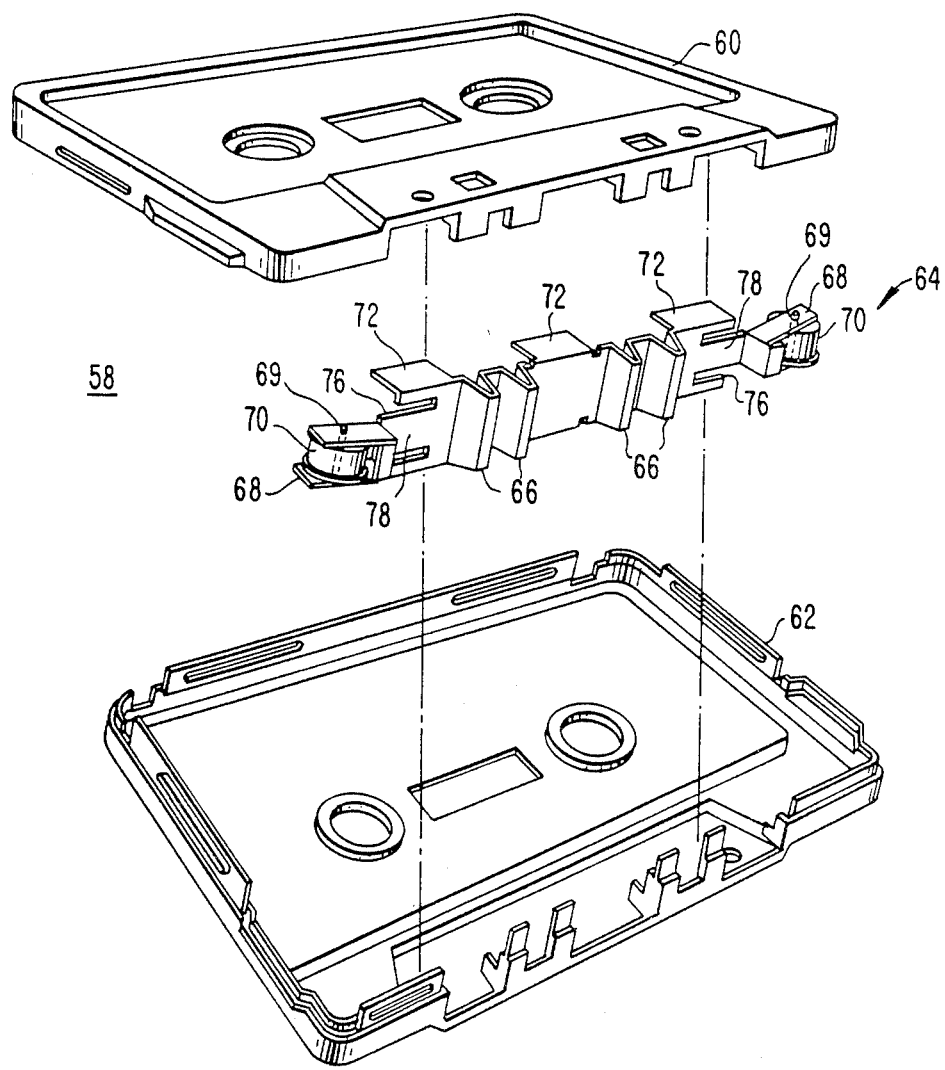
FIG. 3 is an exploded, perspective view of another known tape cassette, illustrating particularly a separate, metal, tape guide with rollers located on axle pins.

Unless otherwise noted, the respective members of the tape cassette 79 according to the present invention are the same as those used in the tape cassette 10 shown in FIGS. 1 and 2 described above, upon which the present invention directly improves. The most important differences regard the structure of the tape guide subassembly and the manner in which this tape guide subassembly cooperates with the tape cassette.

As best seen in FIGS. 4 and 5, the tape guide subassembly 80 according to the present invention is a one-piece, relatively rigid, injection molded, elongated bridge 82 having a top 84, a bottom 86, a front 88, a back 90, a left end 92 and a right end 94. The bridge 82 is formed of a plastic or, at least, a comparable material that can be injection molded. On the front 88 of the bridge 82, there is formed an upper left corner post 96, a lower left corner post 98, an upper right corner post 100 and a lower right corner post 102. Each pair of posts 96, 98 and 100, 102 has a hole 104 extending therethrough for receiving the ends of a left pin 106 and a right pin 108, both of which are preferably cylindrical, of even length and made of non-magnetic stainless steel. The pins 106 and 108 are positioned within the holes 104 such that they are perpendicular to the planes of the top 84 and the bottom 86 of the bridge 82 (and accordingly, parallel to each other).

At the front 88 of the tape guide subassembly 80, there also are formed (from left to right) projections or ribs denominated by the letters A, B, C and D, each of which is molded perpendicular to the planes of the top 84 and bottom 86 of the tape guide subassembly 80. The projections A–D, the stainless steel pins 106 and 108, and the tape rollers 110, 112 described below, define the central tape support area of the tape cassette 79 according to the present invention.

The tape guide subassembly 80 also includes bearing extensions 116 and 118 on the left and right ends 92 and 94, respectively, of the bridge 82. These bearing extensions 116, 118 are integrally molded as a part of the one-piece bridge 82 to extend from projections A and D, respectively. Each bearing extension 116 and 118 includes a pair of opposing, parallel, and substantially planar members 120 and 122 which are flexible relative to each other in the directions perpendicular to their planes.

Each planar member 120, 122 is preferably in the shape of a circle 121 suspended from the projections A or D by a flat support member 123. Of course, the planar members 120, 122 can be configured in other shapes as suggested by FIG. 11 herein. Circular is preferred because circular bearing surfaces are easier to mold than irregular bearing surfaces and the interface of circular bearing extensions 116, 118 with the circular depressions 125 described below is more easily obtained during assembly.

Each circle 121 and support member 123 is parallel to the relatively planar top and bottom half, 84 and 86, respectively, of the tape guide subassembly 80, but each circle 121 is slightly elevated above the corresponding support member 123. In order to provide enough room in the tape cassette for the elevated circles 121, circular depressions 125 are formed in the top and bottom halves 84 and 86, respectively, of the tape cassette 79, to receive the circles 121 and help orient the tape guide 80 relative to the tape cassette 79. That is, the circular depressions 125 advantageously help stabilize the roller position, i.e., minimize lateral movement of the roller centerline.

In direct contrast to U.S. Pat. No. 4,506,846, discussed above, where the rollers 34, 36 are directly received by the cassette halves 12 and 14, in the present invention separate distinct members, i.e., planar members 120, 122, are disposed between the cassette halves and the ends of the rollers.

In light of the above novel structure, the tape guide bridge 82 of the present invention can be made of a low-friction material having lubricity characteristics specifically beneficial to rotation of the rollers More particularly, the tape guide according to the present invention can be formed of an acrylonitrile-butadiene-styrene (ABS) including an external lubricant additive such as Monsanto ABS resin number 958. Such low friction additives are mixed with the ABS and eventually migrate to the surface of the bridge 82 to create added surface lubricity to facilitate rotation of the rollers within the bearing extensions 116, 118.

As a result, making the entire cassette halves with lubricity, which is disadvantageous from a cost, manufacturing, handling and printing standpoint, or separately lubricating columns 38 and 40, as is conventionally done, can now be avoided. In addition, the slippery surface of the tape guide bridge 82 improves life expectancy of the tape travelling against the slippery projections A, B, C and D located at the front of the bridge 82.

This structure is in direct contrast to U.S. Pat. No. 4,079,499 discussed above, where the tape contacting the metal front support surfaces 66 undoubtely creates unwanted friction, as do the rotating rollers 70 against the metal side supports 68. Also, unlike U.S. Pat. No. 4,079,499 and Japanese Reference No. 56-50354, discussed above, the circles 121 of the bearing extensions 116, 118, cooperate with the circular depressions 125 to assist in orienting the tape guide subassembly 80 in the tape cassette 79 and to prevent the bearing extensions 116, 118 from moving in a direction toward the back of the tape cassette 79 during operation.

Further, unlike co-owned U.S. Pat. No. 4,506,846, described above, the roller 110, 112 according to the present invention is separated from the circular depression 125 formed in the top and bottom halves, 14 and 12, respectively, by the circles 121 of the planar members 120, 122.

Finally, unlike at least U.S. Pat. Nos. 4,079,499 and 4,506,846, the axles for rotation of the tape rollers 110, 112 are preferably formed either as integral extensions of the injection molded bearing extensions of the bridge or of the rollers themselves.

Each of the bearing extensions 116, 118 also includes roller receiving means 124 formed therein. Each roller receiving means 124 receives the axle of a roller 112, 110 shown in FIGS. 9 and 10, respectively, as described below.

The roller receiving means 124 is in the form of several embodiments in the present invention as will now be described.

Figure 12:
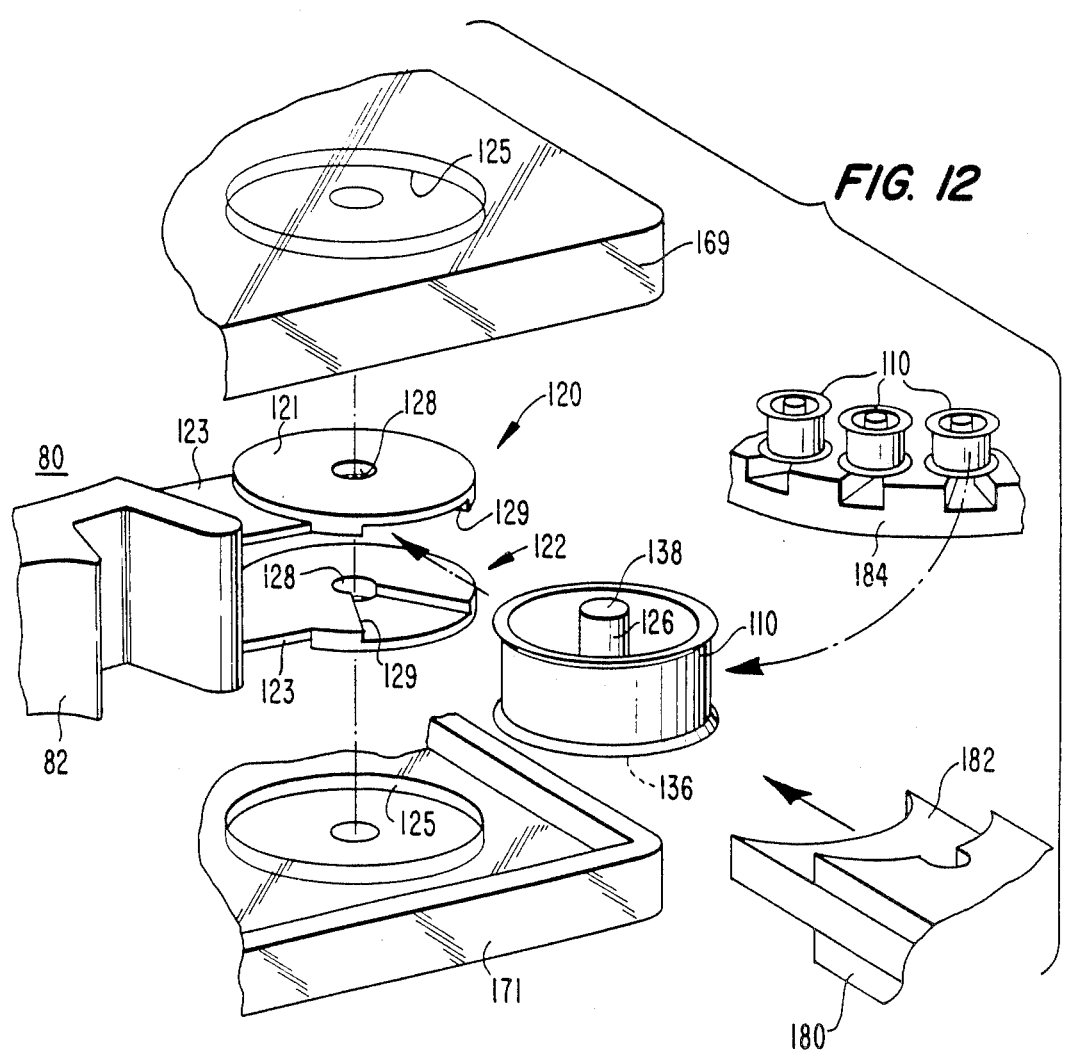
FIG. 12 is a schematic view illustrating the method of manufacturing according to the present invention.

In a first embodiment shown in FIGS. 4 and 5, the roller receiving means 124 includes a hole 128 formed centrally in and through each planar member 120 and 122. As can be seen, the holes 128 are colinear for receiving the ends of the axle 126 of the roller 110 shown in FIG. 10. The roller receiving means 124 also includes in this embodiment a recessed, angled area 129 formed in each planar member 120, 122 which merges with the hole 128. As shown in FIG. 12, the recessed, angled area 129 provides a channel for easily and quickly directing the ends of the axle of the roller 110 into the hole 128. As a result, if the axle 126 is inserted into the recessed, angled area 129 slightly to the left or right thereof, the axle 126 is directed toward the rear middle of the recessed, angled area 129 and into the hole 128 during automated assembly.

A minimal amount of clearance exists between each planar member 120, 122 and the ends of the rollers 110, 112 to allow smooth rotation. In this regard, the members 120, 122 should be formed as parallel as possible to avoid any friction between the planar members 120, 122 and the ends of the rollers.

FIG. 10 is a side view of the roller 110 formed of a single-piece of injection molded material, preferably a hard plastic. This roller 110 has a cylindrical surface 130 with lateral projections 132 which contain the tape (not shown) moving thereacross. In addition, the axle 126 can be formed integrally or separately of the roller 110 and is separated from the cylindrical surface 130 at equal, radial points by spacers 134, for example, three spacers integrally formed as a part of the one-piece roller. The axle 126 is solid and the opposite short ends thereof 136 and 138 are guided during assembly by the recessed, angled area 129 into the holes 128 formed on the planar members 120 and 122 for rotation, as described above.

Preferably, the edges of the axle ends 136 and 138 are bevelled to facilitate receipt and movement in the roller receiving means 124. The bevelled edges are exaggerated for purposes of illustration. In practice, due to molding considerations, the bevelled edges 146 would be a minimal chamfer or radius.

The diameter of the axle 126 is approximately 0.125". The diameters of the corresponding holes 128 and circular indentations 140 discussed below are slightly larger to receive the ends 136 and 138 of the axle 126 for rotation. The ends 136 and 138 do not extend beyond the planar members 120, 122, to prevent abutting the circular depressions 125 formed in the top and bottom halves, 14 and 12, respectively.

With the preferred embodiment of the roller 110 of the present invention having an integrated axle 126, it is possible to control much more accurately the parallelism of the axle 126 relative to the tape bearing surface 130 of the roller 110. Conventional rollers with a central through hole of a particular internal diameter are typically molded by way of a core pin and the plastic is molded around the pin. In the prior art, there is a definite tendency for this internal diameter to skew, perhaps due to the gate location. That is, when the roller comes out of the mold, it is ejected by a metal sleeve that pushes on a bearing surface that is hopefully concentric to the internal diameter of the roller. The plastic that flows through the mold to make the roller usually comes in from only one side or another. It is possible that as one starts to strip and push the roller, the roller has a tendency to move to one side and then the internal diameter becomes skewed as a result, which is a disadvantage well known and long unsolved in the art. With the present invention, however, only a short bearing surface at the axles is required, which can be made much more concentric to the roller outer diameter, i.e., surface 130, than was possible in the prior art.

Figure 6:
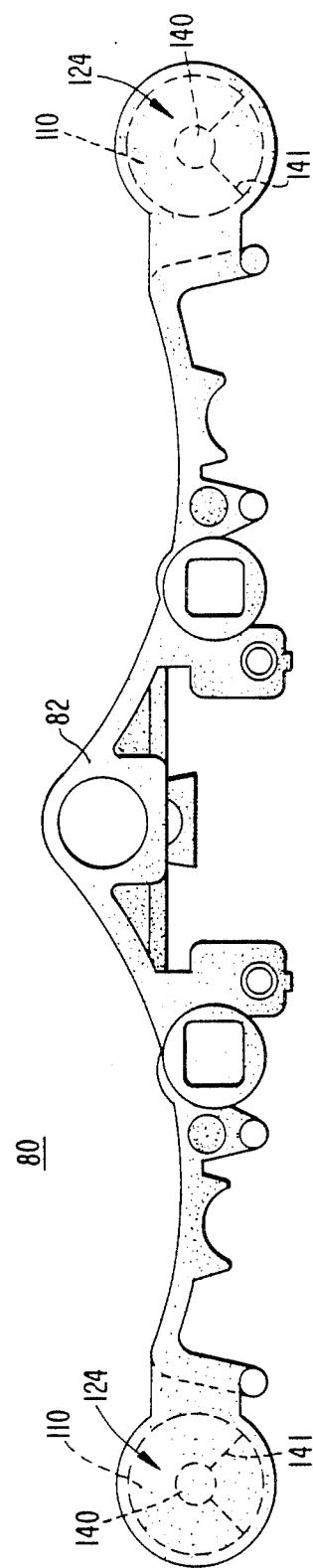
FIG. 6 is a top, plan view of a second embodiment of the tape guide subassembly according to the present invention.
Figure 7:
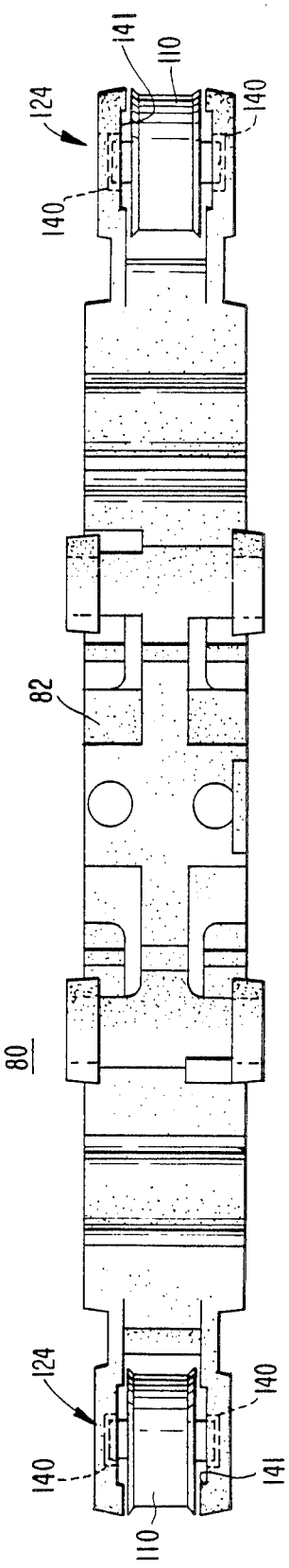
FIG. 7 is a front view of the second embodiment of the tape guide subassembly shown in FIG. 6.

A second embodiment of the tape guide subassembly 80 according to the present invention is illustrated by FIGS. 6 and 7. In this embodiment, the roller receiving means 124 of the tape guide subassembly 80 is a circular indentation 140 formed in each planar member 120 and 122. In contrast to the embodiment shown in FIGS. 4 and 5, the circular indentations 140 are not continuous through the planar members 120, 122. These circular indentations 140 are formed in a colinear manner for receiving the ends 136 and 138 of the axle 126 of the roller 110 shown in FIG. 10. Again, a recessed, angled area 141 is formed in each planar member 120, 122 to assist in guiding the ends 136, 138 of the roller 110 into the respective circular indentations 140.

FIG. 8 is a top, cross-sectional view of a third embodiment of the tape guide subassembly 80 according to the present invention. This third embodiment differs from the holes 128 of the first embodiment and the circular indentations 140 of the second embodiment by using short projections 142 formed on and extending from the flexible planar members 120 and 122 to oppose each other and receive the cored ends 149, 150 of the axle 146 of the roller 112 shown in FIG. 9 and described below. The projections 142 are formed as an integral part of the one-piece, injection-molded, tape guide subassembly 80. During assembly, the planar members 120 and 122 with the projections 142 are separated to receive the respective cored ends of the axle 146 of the roller 112.

More particularly, FIG. 9 is a side, cross-sectional view of an alternate embodiment of the roller according to the present invention. This roller 112 is formed of a single-piece of injection-molded material and also has a cylindrical surface 143 with lateral projections 144 to contain the tape (not shown). In addition, the axle 146 can be formed integrally or separately of the roller 112 and is separated from the cylindrical surface 143 at equal, radial points by integrally formed spacers 148. The axle 146 of this embodiment is cored at the short, bevelled ends 149 and 150 thereof to rotatably receive the projections 142 formed on the inside walls of the planar members 120 and 122.

Figure 11:
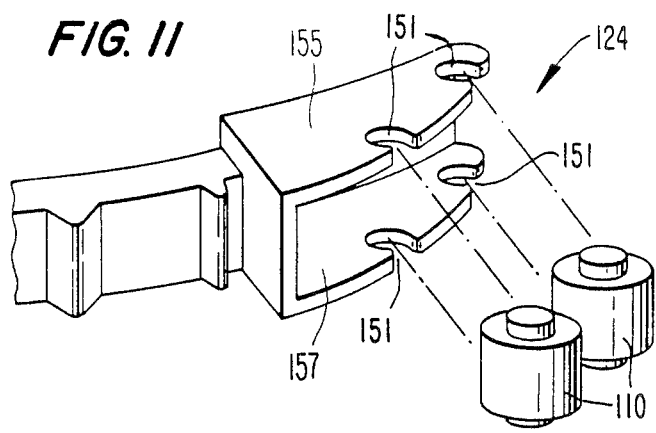
FIG. 11 is a cut away, perspective view of a fourth embodiment of the tape guide subassembly according to the present invention, illustrating particularly the use of a plurality of rollers on each side of the tape guide subassembly.

FIG. 11 is a cut away, perspective view of another embodiment of the tape guide subassembly 80 according to the present invention, illustrating particularly the use of a plurality of integrated rollers 110 in each bearing extension 116, 118. More particularly, this embodiment incorporates as the roller receiving means 124 a plurality of inlets 151 formed in colinear pairs at the forward edges or side walls of planar members 120, 122. Each opposing pair of inlets 151 receives a roller 110 such as shown in FIG. 10 by the method described below. With this embodiment, there is no need to locate a roller axle into a hole or recess formed interiorally of a planar member 155, 157. Instead, the axle 126 of the roller 110 is merely received by paired inlets 151 at the edge of the planar members 155, 157.

In contrast to the above-discussed problems associated with achieving concentricity in the conventional roller, with the present invention the axle external diameters can be made more concentric to the tape bearing surface of the roller than the internal diameter of the conventional roller could be. In addition, since the parameters of the roller according to the present invention can be more accurately controlled, the traditional, unwanted potential for excess axial clearance between the roller and the cassette halves can be substantially minimized. Minimal clearance is further enhanced by improved control over molding of the bearing extensions 116, 118 and their interface with the circular recesses 125 in the top and bottom halves, 14 and 12, respectively.

With reference again being made to FIGS. 4 and 5, the tape cassette 79 and tape guide subassembly 80 according to the present invention also comprise the following features. A leaf spring 152 and a relatively soft, low friction tape contacting member 153 are positioned at the front 88 of the tape guide subassembly 80. A relatively rigid shield 154 having a rectangular shape rests on a ledge 156 extending perpendicularly from the bottom of a wall 158. This shield 154 is a conventional means of keeping magnetic signals which are produced near the recording head away from the tape on the tape reels.

The tape guide subassembly 80 also contains a pair of bottom-to-top diagonally opposed primary locating holes 162 and a pair of top-to-bottom diagonally opposed secondary locating holes 160. The primary and secondary locating holes 162, 160, respectively, are important because they define the position of the central tape support area of the present invention, i.e., the combination of the projections A, B, C and D, the steel pins 106 and 108, and the rollers 110, 112 described above, relative to the magnetic head of the tape player/recorder as described below.

Positioned around each of the primary and secondary locating holes, 162 and 160, respectively, on the left side of the tape guide subassembly 80, are left collars 164, and positioned around each of the holes 160 and 162 on the right side are right collars 166. When the tape cassette 79 is being assembled, the left and right collars 164 and 166 are positioned within holes 168 located in the top and bottom halves 169, 171, respectively, of the tape cassette 79 with a slight clearance therebetween.

The tape guide subassembly 80 also has a substantially cylindrical hole 170 near the central back 90 thereof which, when the tape guide subassembly 80 is inserted into the tape cassette 79, surrounds a shaft 172 formed on the bottom half 86 of the tape cassette 79.

When the tape cassette 79 is inserted into a conventional tape player/recorder, the tape player/recorder interfaces with the tape guide subassembly 80, not the tape cassette halves 169, 171. That is, the one or two locating guide pins of the tape player/recorder enter the primary and secondary locating holes 162, 160 and the tape guide subassembly 80 is allowed to float to a certain degree to be oriented properly by the locating guide pin(s). This movement is notwithstanding any structural imperfections in the top and bottom halves 169, 171 of the tape cassette 79 and the interfaces of the bearing extensions 116, 118 by circular depressions 125, the collars 164, 166 by the holes 168, and the shaft 172 by the hole 170. In this way, the plane formed by the surfaces of the rollers 110, 112, the pins 106, 108 and the projections A-D, i.e., the central tape support area, is properly oriented parallel to the plane of the magnetic head of the tape player/recorder.

As can be seen from the above description, the present invention is an advance over the prior art tape guide subassemblies in that it combines a more accurate, one-piece, injection-molded, separate tape guide with bearing extensions which are received by the tape cassette cover and base and which are integrally formed to receive one-piece, injection-molded, axled rollers characterized by a high degree of concentricity and minimal clearance. Together, these features result in superior tape alignment relative to the magnetic head of the tape player/recorder which, of course, creates improved tape recording/reproducing ability.

FIG. 12 illustrates the method for manufacturing the tape cassette described above, which method is more suitable to automation than the methods associated with U.S. Pat. No. 4,079,499 or Japanese Reference No. 56-50354. According to the method of the present invention, the tape cassette 79 is first formed to include the substantially planar top half 169, the substantially planar bottom half 171, the elongated tape guide subassembly 80 and the tape rollers 110, 112. The tape guide subassembly 80 is formed by a one-step injection molding to include the one-piece bridge 82 with the left and right ends including the bearing extensions 116, 118, respectively, and roller receiving means 124 integrally molded thereof. Rollers 110, 112 are also formed by a one-step, injection-molding to include a one-piece roller preferably having an axle integrally molded therein whose ends extend from the roller. The roller 110, 112 is then located in the roller receiving means 124 for rotation.

More particularly, as seen in FIG. 12, a tool 180 with a holding area 182 corresponding to the shape of the roller to be inserted is advanced to a circular turret or conveyor 184 carrying a plurality of rollers, in this case the rollers 110 shown in FIG. 10 with the integrally molded, solid axle 126. The tool 180 selects and transports automatically one roller 110 to a bearing extension 116, 118. With the axle 126 oriented perpendicular to the parallel, planar members 120, 122, the tool 180 pushes the axle 126 into the recessed, angled area 129. As the tool 180 pushes inwardly, the relatively flexible planar members 120, 122 separate enough to allow the axle 126 to slide between them. As the axle 126 is being slid between the members 120, 122, the recessed angled, area 129 directs the axle ends 136, 138 thereof into the roller receiving means 124, in this case the colinear holes 128. As the roller 110 enters the colinear holes 128, the planar members 120, 122 return to their original positions to rotatably receive the roller 110.

As can be seen, this method eliminates the conventional step of lubricating the columns 38 and 40 and holding the rollers 34 and 36 in place after assembly in the columns 38 and 40. This method also eliminates the need of separately inserting the conventional pin 69 into a roller 70 during assembly, and the need to visually orient the roller relative to the holes formed in the side supports 68 to receive the pins 69. Overall, the present invention saves significant time of assembly compared to the two prior art methods.

Of course, the same method of manufacture can be performed with the second embodiment of the roller receiving means 124, i.e., the circular indentations 140. On the other hand, with the third embodiment of the roller receiving means 124, i.e., the projections 142, some external force must be used to separate the planar members 120, 122 and accordingly, separate the projections 142, at least a distance equal to the length of the axle 146 to allow the projections 142 to receive the bevelled, cored ends 149 and 150 of the axle 146 of the roller 112.

Once the rollers are received by the roller receiving means 124, the tape guide subassembly 80 is assembled in the front area of the tape cassette 79. As stated above, during assembly of the tape cassette 79, the circles 121 are received by the circular depressions 125 to help orient the tape guide subassembly 80 relative to the tape cassette 79 and to prevent horizontal movement of the bearing extensions 116, 118 during operation.

When assembled, a minimal amount of clearance should exist between the ends of the rollers and the bearing extensions 116, 118, and between the bearing extensions 116, 118 and the circular depressions 125 to avoid any binding of the rollers and to allow the relative flexibility of the tape guide subassembly 80 relative to the tape cassette 79 as described above for optimum operation of the tape cassette 79.

Due to the fact that the present invention uses both an injection molded, plastic bridge 82 and rollers 110, 112, these members can be quickly and easily formed simultaneously by double stage molding, a method known in the art. That is, the rollers 110, 112 can be injection molded right into the bridge 82, which eliminates the separate steps of forming the bridge, forming the roller, transporting the roller to the bridge and inserting the roller into the bearing extension.

The method according to the present invention is in contrast to the method described above regarding co-owned U.S. Pat. No. 4,506,846, in that, by incorporating the rollers 110, 112 into the tape guide subassembly 80, there is no longer any need to retain the rollers during assembly, which is a troublesome and inefficient procedure. The method described herein also differs from those described above for U.S. Pat. No. 4,079,499 and Japanese Reference No. 56-50354, in that the roller is integrally molded with a rotational axle and quickly and easily guided to the roller receiving means 124 via the recessed, angled areas 129. Alternatively, the rollers may be formed directly in the bearing extensions by double stage molding.

The foregoing is considered illustrative only of the principles of the invention. Further, since numerous modifications and changes will readily occur to those skilled in the art, it is not desired to limit the invention to the exact construction and operation shown and described. For example, any combination of the holes 128, recesses 140 and projections 142 can be used together as desired, such as one axle being received at one end by a hole 128 and the other end being received by a projection 142, with the ends of the axle of the roller being appropriately modified. Accordingly, all suitable modifications and equivalents may be resorted to, falling within the scope of the invention and the appended claims and their equivalents.

We claim:

1. A method for manufacturing a tape guide subassembly for a tape cassette, comprising the steps of:
   (a) forming a tape guide subassembly by a one-step injection molding to include a relatively rigid, one-piece bridge having left and right ends, each of which includes a bearing planar members extending from respective support members, each of which is parallel to a planar top and bottom of the bridge, and roller receiving means molded as an integral part of the tape guide subassembly;

(b) forming a roller; and (c) locating the roller in the roller receiving means for rotation by inserting the roller in the roller receiving means between the planar members.

2. The method as recited in claim 1, wherein steps (a), (b) and (c) are performed simultaneously by double stage molding.

3. The method as recited in claim 1, wherein steps (b) and (c) comprise the substeps of:
(i) separately forming the roller,
(ii) advancing the roller by automated apparatus to the pair of planar members,
(iii) pushing the roller into the roller receiving means to cause the planar members to move from a parallel to a non-parallel position and then return to the parallel position.

4. The method as recited by claim 1, wherein step (b) comprises the substep of:
forming each roller to include an axle having solid 5. The method as recited in claim 4, wherein the substep comprises the further substep of:
integrally forming the axle of the roller.

6. The method ,as recited by claim 1, wherein step (b) comprises the substep of:
forming each roller to include an axle having cored ends.

7. The method as recited in claim 6, wherein the substep further comprises:
integrally forming the axle of the roller.

8. The method as recited in claim 1, wherein step (a) comprises the substep of:
forming each bearing e tension to include a pair of opposed, parallel and substantially planar members which are integrally molded as a part of the one-piece bridge and are capable of movement only perpendicularly relative to each other.

9. The method as recited in claim 8, wherein step (a) comprises the substep of:
forming the roller receiving means to include a recessed, angled area extending to a hole formed centrally in each planar member, the two holes formed in the two planar members of each bearing extension being colinear and perpendicular to the parallel, planar members.

10. The method as recited in claim 8, wherein step (a) comprises the substep of:
forming the roller receiving means to include a recessed, angled area extending to a circular recess formed centrally in each planar member, the two circular recesses formed in the two planar members of each bearing extension being colinear and perpendicular to the parallel, planar members.

11. The method as recited in claim 8, wherein step (a) includes the substep of:
forming the roller receiving means to include a projection formed centrally on each planar member, the two projections formed in the two planar members of each bearing extension being opposing, colinear and perpendicular to the parallel planar members.

12. A method for assembling a tape guide subassembly for a tape cassette, comprising the steps of:
(a) picking up a roller having an axle integrally formed therein from a roller supply means via a tool;

(b) advancing the roller to the tape guide having a flexible bearing extension including two parallel, planar members molded integrally at an end thereof, the bearing extension being formed to include a roller receiving means; and (c) inserting the roller into the bearing extension which causes the parallel planar members to separate to a non-parallel position, receive the roller within the roller receiving means and return to the parallel position.

13. A method for manufacturing a tape cassette for use in a tape player/recorder provided with a magnetic head, the tape cassette being formed to include a substantially planar top half, a substantially planar bottom half, and an elongated tape guide subassembly formed separately of, and arranged to be disposed between, the top and bottom halves, the improvement comprising the steps of:

(a) forming the tape guide subassembly by a one-step injection molding to include a relatively rigid, one-piece bridge having left and right ends, each of which includes a bearing extension with a pair of opposed, parallel and substantially planar members extending from respective support members, each of which is parallel to a planar top and bottom of the bridge, and roller receiving means molded as an integral part of the tape guide subassembly;

(b) forming a roller; and (c) locating the roller in the roller receiving means for rotation by inserting the roller in the roller receiving means between the planar members.

14. The method as recited in claim 13, further comprising the steps of:
(d) forming the top half and bottom half of the tape cassette by injection molding to include bearing extension receiving means integrally molded therein; and
(e) inserting the tape guide subassembly into the tape cassette such that the bearing extensions are received by the bearing extension receiving means.

15. The method as recited in claim 13, wherein steps (a), (b) and (c) are performed simultaneously by double stage molding.

16. The method as recited in claim 13, wherein step (b) comprises the substep of:
forming each roller to include an axle having solid ends.

17. The method as recited in claim 16, further comprising the substep of:
integrally forming the axle of the roller.

18. The method as recited by claim 12, wherein step (b) comprises the substep of:
forming each roller to include an axle having cored ends.

19. The method as recited in claim 18, further comprising the substep of:
integrally forming the axle of the roller.

20. The method as recited in claim 13, wherein steps (b) and (c) comprise the substeps of:
(i) separately forming the roller,
(ii) advancing the roller by automated apparatus to the pair of planar members,
(iii) pushing the roller into the roller receiving means to cause the planar members to move from the parallel to a non-parallel position and then return to the parallel position.

21. The method as recited in claim 3, wherein step (a) comprises the substep of:

forming the roller receiving means to include a recessed, angled area extending to a hole formed centrally in each planar member, the two holes formed in the two planar members of each bearing extension being colinear and perpendicular to the parallel, planar members.

22. The method as recited in claim 13, wherein step (a) comprises the substep of:
forming the roller receiving means to include a recessed, angled area extending to a circular recess formed centrally in each planar member, the two circular recesses formed in the two planar members of each bearing extension being colinear and perpendicular to the parallel, planar members.

23. The method as recited in claim 13, wherein step (a) includes the substep of:
forming the roller receiving means to include a projection formed centrally on each planar member, the two projections formed in the two planar members of each bearing extension being opposing, colinear and perpendicular to the parallel planar members.

24. A method for assembling a tape cassette, comprising the steps of:
(a) picking up a roller having an axle integrally formed therein from a roller supply means via a tool;
(b) advancing the roller to a tape guide subassembly having a flexible bearing extension including two parallel, planar members molded integrally at each end thereof, each bearing extension being formed to include a roller receiving means;
(c) inserting one of the rollers into each bearing extension which causes the parallel, planar members to separate to a non-planar position, receive the roller within the roller receiving means and return to the parallel position;
(d) forming the top half and bottom half of the tape cassette to include bearing extension receiving means integrally molded therein; and
(e) inserting the tape guide subassembly into the tape cassette such that the bearing extension are received by the bearing extension receiving means.

* * * * *